No. 759,740. PATENTED MAY 10, 1904.
J. NOBLE & E. L. ANDERSON.
BATTERY.
APPLICATION FILED JUNE 1, 1903.
NO MODEL.
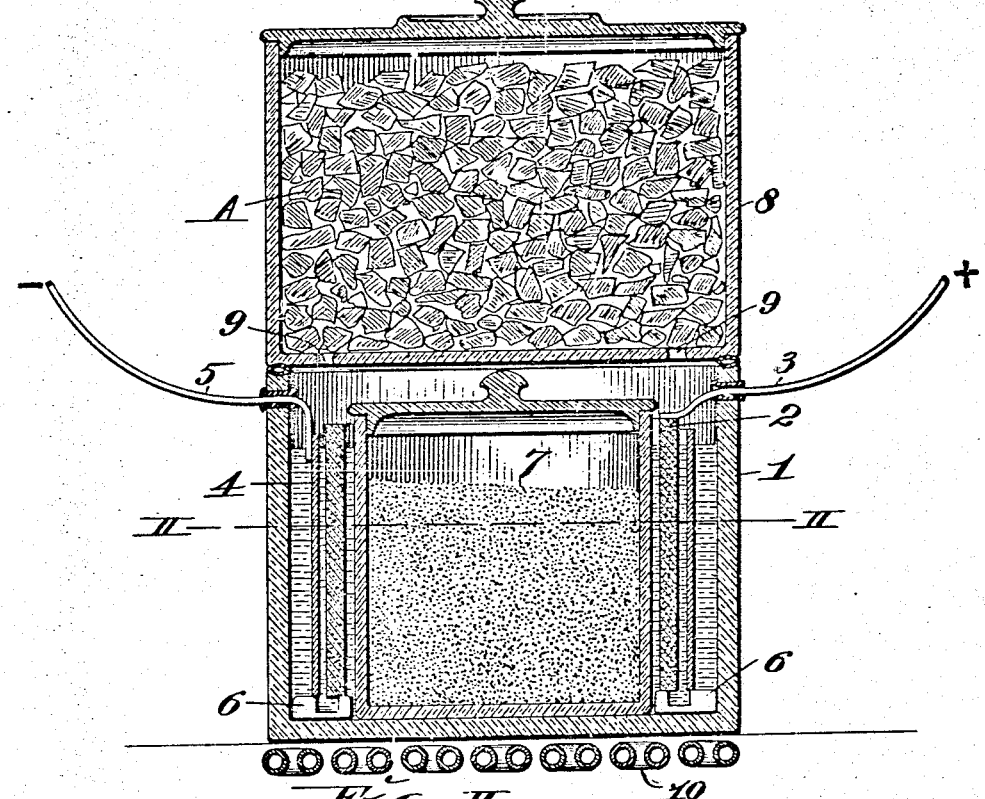
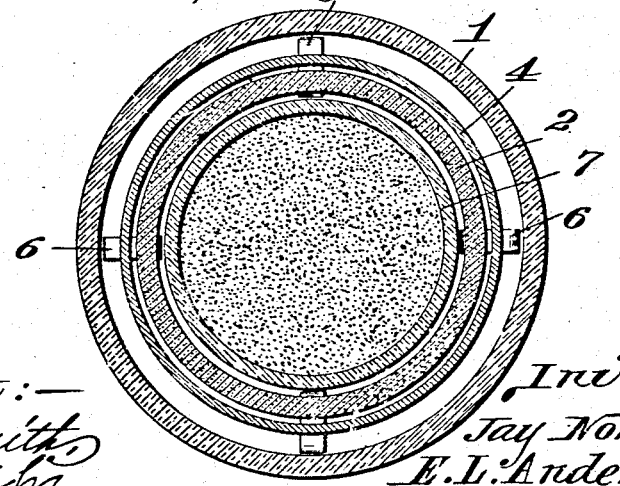
attest:—
M. F. Smith
E. S. Knight
Inventors.
Jay Noble and
E. L. Anderson.
By Knight Bro. atty's.

No. 759,740.

Patented May 10, 1904.

UNITED STATES PATENT OFFICE.

JAY NOBLE AND EDWARD L. ANDERSON, OF ST. LOUIS, MISSOURI.

BATTERY.

SPECIFICATION forming part of Letters Patent No. 759,740, dated May 10, 1904.

Application filed June 1, 1903. Serial No. 159,469. (No model.)

*To all whom it may concern:*

Be it known that we, JAY NOBLE and EDWARD L. ANDERSON, citizens of the United States, residing in the city of St. Louis, State of Missouri, have invented certain new and useful Improvements in Batteries, of which the following is a full, clear, and exact description, reference being had to the accompanying drawings, forming part of this specification.

Our invention relates to a primary battery; and, broadly stated, the invention consists in a battery in which electrical energy is produced by the oxidation of carbon or coke.

The invention further consists of other features of novelty hereinafter fully described, and pointed out in the claims.

Figure I is a vertical section of our improved battery. Fig. II is a horizontal section taken on line II II, Fig. I.

In our battery we make use of two electrodes, one of which is of carbon and the other preferably of aluminium, though it may be of any other desirable material that is not subject to decomposition by the electrolyte used in the battery. Of such electrodes that of carbon serves as the cathode and the aluminium or non-decomposable electrode serves as the anode. The electrolyte used in the battery is a solution of nitric acid diluted by the addition of water thereto to derive proper strength for desirable service in the battery. We prefer that the electrolyte be composed of one-half equal parts of concentrated nitric acid and pure water. In combination with the cell containing the electrodes and the electrolyte referred to we utilize a condenser in which is placed a mass of carbon or coke and into which the gases evolved from the cell are condensed and returned to the cell again for renewed use.

In the accompanying drawings, 1 designates a cell into which the electrolytic solution hereinbefore mentioned is introduced.

2 is the carbon cathode, having a terminal 3, and 4 is the aluminium or other non-decomposable anode, having a terminal 5. The electrodes 2 and 4 are preferably supported in the cell upon blocks 6.

7 is a filler centrally situated in the cell 1 to displace the electrolyte therein and afford a large area of solution-space around it in which the electrodes are positioned, so that said electrodes will receive the contact of the solution in large surface without the expenditure and use of sufficient solution to fill the cell. The filler 7 is shown in the form of a jar containing material such as sand to hold it centrally depressed in the cell; but it may be of any other desirable form.

8 designates a condenser surmounting the cell 1 and provided with apertures 9 in its bottom through which communication from the interior of said cell to the interior of said condenser is provided. In the condenser 8 is a mass A of carbon, coke, or analogous material, which is kept constantly moistened for the purpose of providing absorbing property therein.

In the use of our battery heat is applied thereto by any suitable means, such as a steam-coil 10, (see Fig. I,) to maintain a temperature in the cell 1 of about 150° Fahrenheit or greater to oxidize the carbon cathode by what is known as "cathodic reduction."

In describing the operation of our battery we do not wish to make any positive assertion on theories as to the chemical or electrochemical reaction that takes place therein by virtue of which the operation of the battery is effected; but we believe this operation to be as follows: When the circuit in the battery is closed, the electrical currents resulting in the cell 1 pass from the non-decomposable anode to the carbon cathode and decompose water in the solution, evolving oxygen therefrom at the surface of the non-decomposable anode, while the hydrogen is evolved at the carbon cathode. The hydrogen so evolved is immediately oxidized or reduced to water in the electrolyte by the action of the nitric acid in such solution, and at the same time nitrogen-peroxid gas is produced.

The nitrogen-peroxid gas just mentioned being produced at the temperature hereinbefore referred to (preferably about 150° Fahrenheit or greater) oxidizes the carbon cathode, thereby forming carbonic-acid gas and nitrogen-oxid gas.

When the nitrogen-oxid gas is evolved in the cell of the battery, it unites with the oxygen evolved from the aluminium or other non-decomposable anode electrode, thereby forming nitrogen-peroxid gas, which passes from the cell into the condenser 8 and enters into the mass of moist carbon or coke therein to be reduced by condensation into nitric acid, thereby returning it to the original condition, and thereupon such acid returns to the cell again for reuse in the same manner as before.

It will be understood from the foregoing that nitrogen-peroxid gas is the essential agent that produces the oxidation of the carbon cathode in our battery. This being the case, we do not desire to be limited to carrying our invention out in strictly the manner herein described, as it is evident that the nitrogen-peroxid gas may be generated aside from the cell of the battery and passed thereinto through the electrolytic solution to the same purpose and with similar result to that in a battery in which such gas is directly generated. Were the nitrogen-peroxid gas produced outside of the cell of the battery and introduced thereinto any suitable electrolyte other than one containing nitric acid may be used in the battery.

Practical demonstrations with our battery have shown that in its use an electromotive force of 1.5 volts is obtained with a very low internal resistance, thereby exhibiting a high degree of efficiency, which is produced in constant current at a small cost.

We claim as our invention—

1. In a battery, the combination of a carbon cathode, an aluminium anode, and a nitric-acid electrolyte, substantially as set forth.

2. In a battery, the combination of a carbon cathode, a non-decomposable anode, a nitric-acid-electrolyte solution, and means for heating the battery, substantially as set forth.

3. In a battery, the combination of a carbon cathode, an aluminium anode, a nitric-acid-electrolyte solution, and means for heating the battery, substantially as set forth.

4. In a battery, the combination of a carbon cathode, a non-decomposable anode, and an electrolyte containing nitrogen-peroxid gas, substantially as set forth.

5. In a battery, the combination of a carbon cathode, a non-decomposable anode, an electrolyte containing nitrogen-peroxid gas, and means for heating the battery, substantially as set forth.

6. In a battery, the combination of a carbon cathode, a non-decomposable anode, a nitric-acid electrolyte, and means for condensing the nitrogen gases evolved in the battery, substantially as set forth.

7. In a battery, the combination of a carbon cathode, an aluminium anode, nitric-acid electrolyte, and means for condensing the nitrogen gases evolved in the battery, substantially as set forth.

8. In a battery, the combination of a carbon cathode, a non-decomposable anode, a nitric-acid electrolyte, means for condensing the nitrogen gases evolved in the battery, and means for heating the battery, substantially as set forth.

9. In a battery, the combination of a carbon cathode, an aluminium anode, a nitric-acid electrolyte, means for condensing the nitrogen gases evolved in said battery, and means for heating the battery, substantially as set forth.

10. In a battery, the combination of a carbon cathode, a non-decomposable anode, an electrolyte containing nitrogen-peroxid gas, means for condensing the nitrogen-oxid gases evolved in the battery, and means for heating the battery, substantially as set forth.

11. In a battery, the combination of a cell, a carbon cathode, a non-decomposable anode, a nitric-acid electrolyte, and a condenser having communication with said cell and containing coke or analogous material to receive the gases evolved in said cell, substantially as set forth.

JAY NOBLE.
EDWARD L. ANDERSON.

In presence of—
E. S. KNIGHT,
M. P. SMITH.